United States Patent
Yee et al.

(10) Patent No.: US 8,098,645 B2
(45) Date of Patent: Jan. 17, 2012

(54) RANDOM ACCESS SLOT SELECTION IN A COMMUNICATIONS SYSTEM

(75) Inventors: David Moon Yee, Scottsdale, AZ (US); Gerard Anthony Smorowski, Jr., Gilbert, AZ (US); Taul Eric Aragaki, Scottsdale, AZ (US); Mark Lawrence Wormley, Scottsdale, AZ (US); James Lynn Warthman, Phoenix, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 981 days.

(21) Appl. No.: 12/035,055

(22) Filed: Feb. 21, 2008

(65) Prior Publication Data

US 2009/0213782 A1    Aug. 27, 2009

(51) Int. Cl.
    *H04B 7/212* (2006.01)
(52) U.S. Cl. ........................ 370/345; 370/443
(58) Field of Classification Search .............. 370/321, 370/322, 316, 319
    See application file for complete search history.

(56) References Cited

U.S. PATENT DOCUMENTS

| 5,729,541 | A  | * | 3/1998  | Hamalainen et al. | ......... 370/337 |
| 6,577,610 | B1 | * | 6/2003  | Kronz              | ............ 370/322 |
| 6,980,562 | B2 |   | 12/2005 | Rudolf et al.      |                    |
| 7,088,734 | B2 |   | 8/2006  | Newberg et al.     |                    |
| 7,110,380 | B2 |   | 9/2006  | Shvodian           |                    |

FOREIGN PATENT DOCUMENTS

| EP | 0228709    | 7/1987  |
| JP | 1085433    | 3/1989  |
| JP | 1188125    | 7/1989  |
| JP | 2238735    | 9/1990  |
| JP | 6053877    | 2/1994  |
| JP | 8265241    | 10/1996 |
| JP | 2003289581 | 10/2003 |

OTHER PUBLICATIONS

Combined Search and Examination Report under sections 17 and 18(3) Issued by the Intellectual Property Office of the United Kingdom in GE0902498.5, Jun. 16, 2009.

* cited by examiner

*Primary Examiner* — Seema S Rao
*Assistant Examiner* — Henry Baron
(74) *Attorney, Agent, or Firm* — Meschkow & Gresham, P.L.C.

(57) ABSTRACT

A communications system (20) includes a resource controller (22) and a terminal (24) in communication with the resource controller (22). Periodically, the resource controller (22) sends a service announcement (46) that identifies a set (50) of timeslots (52) within a communication resource (40) configured for random access within a future frame (42). The terminal (24) ascertains a burst characteristic (118) of a message (54) to be sent from the terminal (24) and generates a random access parameter (128). The terminal (24) selects one of the timeslots (52) from the set (50) in accordance with the random access parameter (128), the timeslot exhibiting a burst type (62) corresponding to the burst characteristic (118) of the message (54). The terminal (24) transmits the message (54) in the selected timeslot (52).

14 Claims, 8 Drawing Sheets

62

| BURST TYPE TABLE | | | |
|---|---|---|---|
| ID | MESSAGE TX SIZE (BITS) | SLOT TX RATE (BPS) | SLOT DURATION (TIME) |
| BT1 | S1 | R1 | D1 |
| BT2 | S1 | R2 | D2 |
| BT3 | S2 | R2 | D3 |
| BT4 | S3 | R2 | D4 |
| BT5 | S1 | R3 | D5 |
| BT6 | S2 | R3 | D6 |
| BT7 | S4 | R3 | D7 |
| BT8 | S5 | R3 | D8 |
| BT9 | S1 | R4 | D9 |
| BT10 | S2 | R4 | D10 |
| BT11 | S4 | R4 | D11 |
| BT12 | S5 | R4 | D12 |

↑ 70    ↑ 64    ↑ 66    ↑ 68    60

| | BURST TYPE TABLE | | |
|---|---|---|---|
| ID | MESSAGE TX SIZE (BITS) | SLOT TX RATE (BPS) | SLOT DURATION (TIME) |
| BT1 | S1 | R1 | D1 |
| BT2 | S1 | R2 | D2 |
| BT3 | S2 | R2 | D3 |
| BT4 | S3 | R2 | D4 |
| BT5 | S1 | R3 | D5 |
| BT6 | S2 | R3 | D6 |
| BT7 | S4 | R3 | D7 |
| BT8 | S5 | R3 | D8 |
| BT9 | S1 | R4 | D9 |
| BT10 | S2 | R4 | D10 |
| BT11 | S4 | R4 | D11 |
| BT12 | S5 | R4 | D12 |

FIG. 5

| SLOT PATTERN ID | SLOT # | SLOT CONFIGURATION PARAMETERS ||||
| | | BURST TYPE ||| SLOT START | SLOT END |
| | | ID | TX SIZE | TX RATE | | |
|---|---|---|---|---|---|---|
| A | 1 | BT1 | S1 | R1 | T1A | T2A |
| B | 1 | BT4 | S3 | R2 | T1B | T2B |
| C | 1 | BT8 | S5 | R3 | T1C | T2C |
| D | 1 | BT2 | S1 | R2 | T1D | T2D |
|   | 2 | BT12 | S5 | R4 | T3D | T4D |
| E | 1 | BT3 | S2 | R2 | T1E | T2E |
|   | 2 | BT5 | S1 | R3 | T3E | T4E |
| F | 1 | BT7 | S4 | R3 | T1F | T2F |
|   | 2 | BT10 | S2 | R4 | T3F | T4F |
| G | 1 | BT2 | S1 | R2 | T1G | T2G |
|   | 2 | BT6 | S2 | R3 | T3G | T4G |
|   | 3 | BT9 | S1 | R4 | T5G | T6G |
| H | 1 | BT5 | S1 | R3 | T1H | T2H |
|   | 2 | BT5 | S1 | R3 | T3H | T4H |
|   | 3 | BT6 | S2 | R3 | T5H | T6H |
| I | 1 | BT6 | S2 | R3 | T1I | T2I |
|   | 2 | BT6 | S2 | R3 | T3I | T4I |
|   | 3 | BT10 | S2 | R4 | T5I | T6I |
| J | 1 | BT10 | S2 | R4 | T1J | T2J |
|   | 2 | BT11 | S4 | R4 | T3J | T4J |
|   | 3 | BT11 | S4 | R4 | T5J | T6J |
| K | 1 | BT9 | S1 | R4 | T1K | T2K |
|   | 2 | BT10 | S2 | R4 | T3K | T4K |
|   | 3 | BT12 | S5 | R4 | T5K | T6K |

RANDOM ACCESS SLOT SELECTION IN A COMMUNICATIONS SYSTEM

TECHNICAL FIELD OF THE INVENTION

The present invention relates to the field of timeslot access schemes for Time Division Multiple Access (TDMA) communications systems. More specifically, the present invention relates to efficient utilization of random access timeslots in a communications system.

BACKGROUND OF THE INVENTION

Time division multiple access (TDMA) is a channel access method for shared medium (usually radio) networks. TDMA allows several users to share the same frequency channel by allocating unique timeslots to each user within the frequency channel. The users transmit in rapid succession, one after the other, each using his allocated timeslot. This allows multiple terminals to share the same transmission medium (e.g. radio frequency channel) while using only part of its bandwidth. Access is controlled using a frame-based approach, and precise system timing is necessary to allow multiple users access to the bandwidth (i.e. time slot access) necessary to transmit information in a multiplexed fashion on the return channel.

TDMA is used in the digital 2G cellular systems, such as, Global System for Mobile Communications (GSM), IS-136, Personal Digital Cellular (PDC), and in the Digital Enhanced Cordless Telecommunications (DECT) standard for portable telephones. TDMA is also used extensively in satellite communications systems, such as Demand Assigned Multiple Access (DAMA) systems, and in combat-net radio systems.

In general, the majority of timeslots in a TDMA communications system are allocated to different communication units by a resource controller (also referred to as a base station, satellite, repeater, controlling node, and the like). This is done so that two or more communication units do not transmit at the same time. The remaining timeslots are designated as random access timeslots by the resource controller. Any of the communication units can transmit in the random access timeslots without previous consultation with the other communication units.

Because the random access timeslots are not assigned to a particular communication unit, multiple communication units may transmit at the same time. When messages sent by any two communication units overlap, a collision occurs, and the message packets that were transmitted are lost. The communication units listen for acknowledgements of their transmissions. If an acknowledgement is not received in response to a message packet transmission, a collision is presumed to have occurred. In response to the presumed collision, the communication units may retransmit in a future random access timeslot. Commonly, when doing such retransmissions, each communication unit waits a random length of time before retransmission so that their retransmissions do not collide a second time.

A well known method of random access to a shared resource is the ALOHA protocol. The standard ALOHA protocol has a maximum throughput of approximately 18.4%. That is, approximately 81.6% of the total available bandwidth is essentially wasted usually due to losses from packet collisions. An improvement to the ALOHA protocol is slotted ALOHA. The slotted ALOHA protocol coordinates and arbitrates random-access to a shared communication channel using TDMA timeslots to reduce collisions. The resource controller emits a signal at the start of each timeslot to let all other communication units know when the timeslot is available. Each timeslot is available to all communication units on a random access basis, and a communication unit can transmit only at the beginning of a timeslot.

The slotted ALOHA protocol has a performance advantage over standard ALOHA, with maximum throughput increasing to approximately 36.8%. A characteristic of a standard slotted ALOHA system is that all of the random-access timeslots are equally available to all communication units. Additionally, all of the random-access timeslots use the same transmission rate and timeslot size. Therefore, a standard slotted ALOHA random-access technique may consider each timeslot to have equal availability and desirability. Because of this, the TDMA timeslots are not utilized efficiently for communication units having different transmission rate capabilities and message packet sizes, thus limiting data throughput.

Therefore, what is needed is a technique for improving bandwidth utilization of random access timeslots of a TDMA system to better accommodate transmissions from communication units having different transmission rate capabilities and message packet sizes.

SUMMARY OF THE INVENTION

Accordingly, it is an advantage of the present invention that a method and system are provided for random access by a terminal to a timeslot within a communication channel.

It is another advantage of the present invention that a method and system are provided that enable a terminal to select a random access timeslot for transmission that best fits its transmission rate and message payload size.

Another advantage of the present invention is that a method and system are provided for timeslot configuration that produces random-access timeslots having different slot transmission rates and message transmit sizes.

The above and other advantages of the present invention are carried out in one form by a method of random access by a terminal to a timeslot within a communication resource. The method calls for ascertaining a burst characteristic of a message to be sent from the terminal and generating a random access parameter. The timeslot is selected from a set of timeslots within the communication resource in accordance with the random access parameter. The timeslot exhibits a burst type corresponding to the burst characteristic of the message. The message is transmitted from the terminal in the selected timeslot.

The above and other advantages of the present invention are carried out in another form by a communications system that includes a resource controller and a plurality of terminals in communication with the resource controller. The resource controller periodically sends a service announcement, the service announcement identifying a set of timeslots within a communication resource configured for random access within a future frame, and each of the timeslots exhibiting a burst type that defines a message transmit size and a slot transmit rate. The terminals receive the service announcement. Each terminal is configured to perform operations that include ascertaining a burst characteristic of a message to be sent from the terminal, the burst characteristic including a payload size and a transmission rate. The terminal generates a random access parameter and selects a timeslot from the set of timeslots in accordance with the random access parameter. The selected timeslot exhibits a burst type that defines a message transmit size that is at least equivalent to the payload size, and the burst type defines a slot transmit rate that matches the transmission rate. The message is transmitted from the terminal in the selected timeslot.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 5 shows a diagram of a slot configuration table utilized in accordance with the present invention;

DETAILED DESCRIPTION OF THE PREFERRED EMBODIMENTS

The methodology and system of the present invention enables random access by a terminal to a timeslot within a communication resource managed by a communications system. The communications system implements a time division multiple access (TDMA) channel access protocol that includes random access timeslots, in which any of a plurality of terminals can transmit in the timeslots without previous consultation with the other terminals.

The methodology and system are based on the premise that terminals have different transmission rate capabilities and message packet sizes. That is, different terminals will have different minimum and/or maximum transmission rate capabilities and different payload sizes for messages to be transmitted. The methodology and system, therefore, use random access timeslots that have different slot transmit rates and different message transmit sizes. The terminals can then select random access timeslots that best fit their capabilities and needs.

Figure 1:
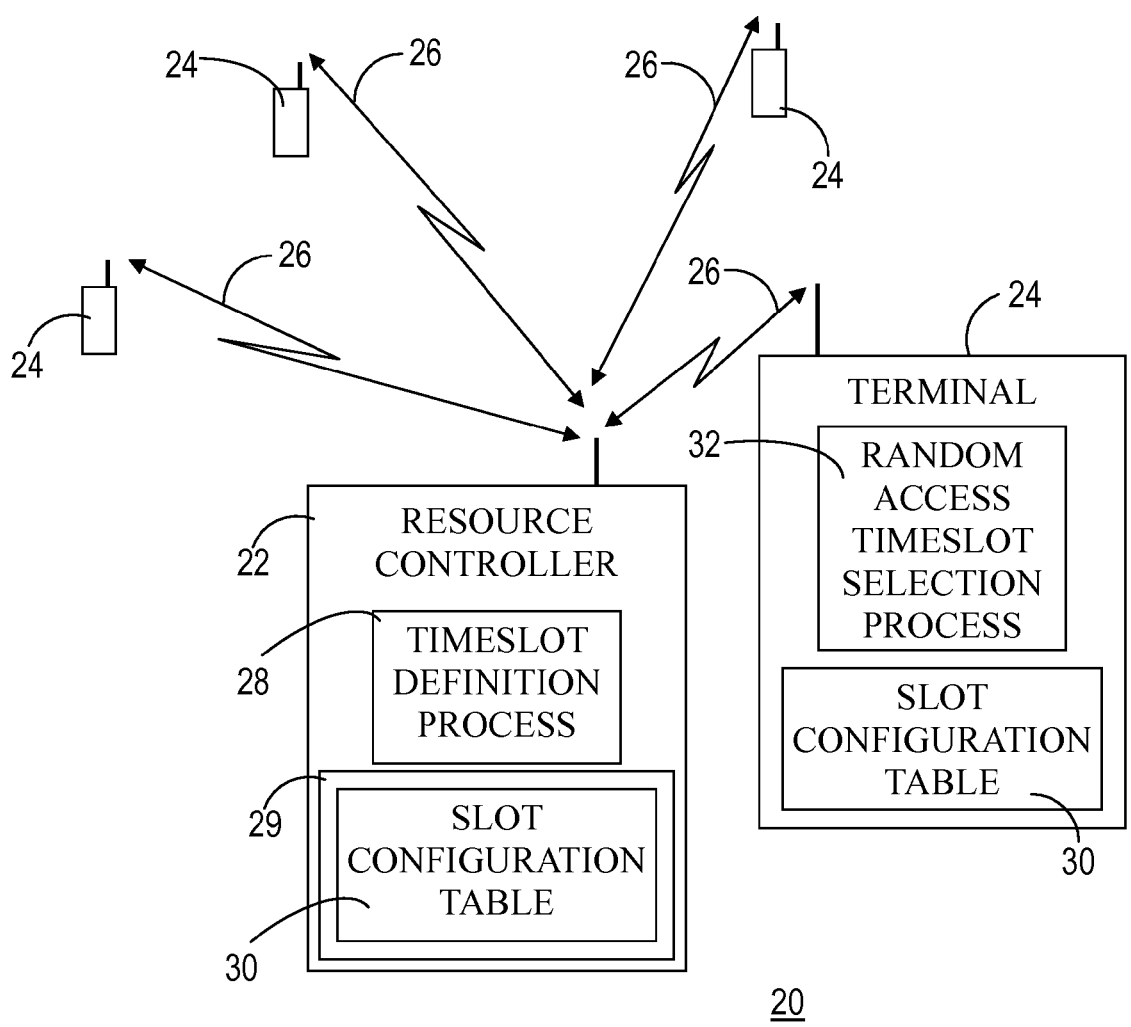
FIG. 1 shows a highly simplified diagram of a portion of a communications system in which the present invention may be implemented.

FIG. 1 shows a highly simplified diagram of a portion of a communications system 20 in which the present invention may be implemented. Communications system 20 generally includes a controlling node, referred to herein as a resource controller 22, and a plurality of communication units, referred to herein as terminals 24. Resource controller 22 and terminals 24 may be in communication with one another via communication links 26 or with other communication devices (not shown).

Communications system 20 represents any of a wide variety of wireless communications systems that implement a TDMA channel access methodology that allows a large number of users to access a single radio-frequency channel, and communication channels having random access timeslots. In particular, communications system 20 may be a demand assigned multiple access (DAMA) communications system that typically maintains and assigns communication channels based on requests issued from terminals 24, and that additionally allocates timeslots of certain communication channels for random access by terminals 24.

In accordance with the present invention, resource controller 22 manages, maintains, and defines random access timeslots within communication links 26. More specifically, resource controller 22 executes an algorithm, referred to herein as a timeslot definition process 28, that defines the random access timeslots for successive frames of a communications channel, with the timeslots exhibiting different burst type characteristics (different slot transmit rates and different message transmit sizes). Timeslot definition process 28 is discussed in connection with FIG. 6. Resource controller 22 includes a memory element 29 having a slot configuration table 30 stored therein that is utilized during the execution of timeslot definition process 28. Slot configuration table 30 is discussed in connection with FIG. 5.

The description of resource controller 22 provided herein is directed toward its management and definition of random access timeslots within successive frames of a communication channel that have different burst type characteristics (different slot transmit rates and different message transmit sizes). It should be understood, however, that the allocation of communication resources (frequency channels, timeslots, and the like) within communications system 20 may additionally be performed by resource controller 22 in accordance with known timeslot allocation processes.

Each of terminals 24 represents a communication unit that is capable of communicating over one of links 26 within communications system 20. Terminals 24 may be mobile or portable wireless radio units, cellular radio/telephones, portable computers with wireless modems, handheld combat search and rescue radios, personnel recovery radios, blue force tracking system, sensors, or any other wireless device with the need to communicate over links 26 within communications system 20.

Different terminals 24 may have different transmission rate capabilities and messages of different sizes to transmit. Each of terminals 24 has stored therein an algorithm, referred to herein as a random access timeslot selection process 32, and slot configuration table 30. In accordance with the present invention, when any of terminals 24 needs to perform a random access transmission, that terminal 24 will execute random access timeslot selection process 32. Process 32 uses the burst type information for the random access timeslots stored in slot configuration table 30 within each of terminals 24. Process 32 is discussed in connection with FIGS. 8 and 9.

The description of terminals 24 provided herein is directed toward random access by terminals 24 to timeslots for the transmission of messages. It should be understood, however, that alternatively, terminals 24 may be allocated non-random access timeslots. The allocation of non-random access timeslots may be performed in accordance with known timeslot allocation processes.

Figure 2:
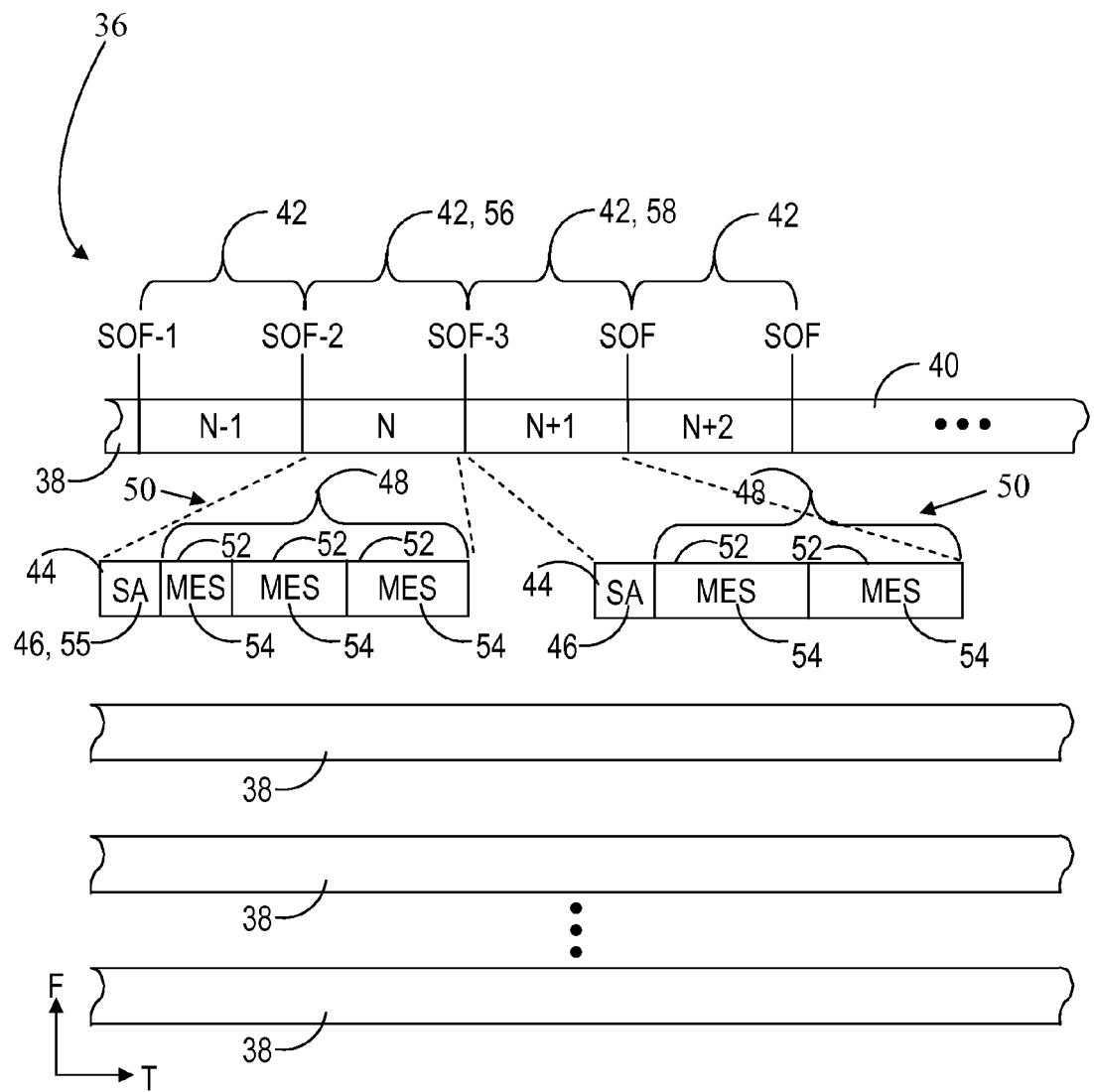
FIG. 2 shows an exemplary frequency-time graph of communication resources that may be accessible by terminals within the communications system.

FIG. 2 shows an exemplary frequency-time graph 34 of communication resources 36 that may be accessible by terminals 24 (FIG. 1) and utilized within communications system 20 (FIG. 1). In this exemplary embodiment, communication resources 36 include multiple frequency channels 38 which may be utilized for control, data, and voice transmission in accordance with known methodologies. In the highly simplified structure shown, one of channels 38 is designated for random access. Thus, this channel is referred to hereinafter as a random access communication resource, or random access channel 40.

Random access channel 40 is divided into fixed intervals in time, known as frames 42. A portion 44 of each of frames 42 may be utilized for transmission of a service announcement (SA) 46 from resource controller 22 (FIG. 1). Another portion 48 of each of frames 42 may be divided into a set 50 of one or more timeslots 52 in accordance with timeslot definition process 28 (FIG. 1). Timeslots 52, each of which accommodates a single burst of information, may be utilized for user traffic, referred to herein as messages (MES) 54.

Service announcement 46 is created and transmitted by resource controller 22 (FIG. 1) and is received and interpreted by terminals 24 (FIG. 1). Initiation of the transmission of service announcement 46 in portion 44 of each of frames 42 indicates the "start-of-frame" (SOF) to enable frame synchronization at every frame 42 so that terminals 24 can synchronize to random access channel 40.

In accordance with the present invention, service announcement 46 contains information communicating network access data, random access timeslot configuration information for timeslots 52 in a future one of frames 42, and acknowledgments for random access communication services for a previous frame 42. Messages 54 may be any user communications from terminals 24, such as data, user terminal call requests, status information, and so forth.

Successive frames 42 can include different sets 50 of timeslots 52. Moreover, each of timeslots 52 may be characterized by a unique burst type (discussed below) that defines a slot transmit rate and a message transmit size (discussed below) for that timeslot 52. This timeslot definition information is provided in service announcement 46, referred to herein as a current service announcement 55, within one of frames 42, referred to herein as a current frame 56, for set 50 of timeslots 52 within a future one of frames 42, referred to herein as a future frame 58. Terminal 24 utilizes the information provided in current service announcement 55 within current frame 56 in order to select one of random access timeslots 52 within future frame 58, or subsequent future frames 58, without previous consultation with resource controller 22 or other terminals 24.

Random access channel 40 is shown as being a discrete one of frequency channels 38. It should be appreciated that in alternative embodiments, the entirety of one of frequency channels 38 need not be designated as random access channel 40. Rather, a portion of one or more of frequency channels 38 may be designated as random access channel 40. Furthermore, the entirety of more than one of frequency channels 38 may be designated for random access.

Figures 3, 4:
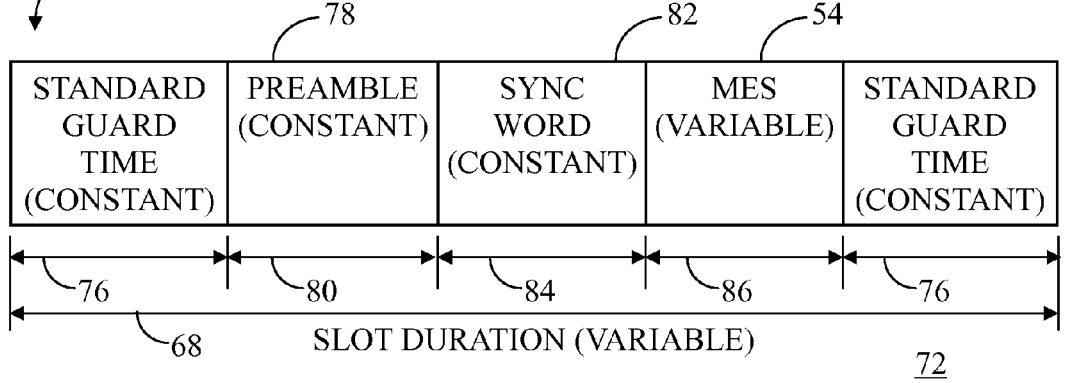
FIG. 3 shows a table of burst types utilized for defining timeslots in accordance with the present invention.
FIG. 4 shows a diagram of a generalized timeslot configuration for any one of the timeslots.

FIG. 3 shows a table 60 of burst types 62 utilized for defining timeslots 52 (FIG. 2) in accordance with the present invention. Each burst type 62 includes at least a message transmit size 64, represented by S1 through S5, and a slot transmit rate 66, represented by R1 through R4. Message transmit size 64 and slot transmit rate 66, along with additional information, such as guard time size, preamble size, sync word size and so forth, may be utilized to determine a timeslot duration 68, represented by D1 through D12, corresponding to each burst type 62. A burst type identifier 70, represented by BT1 through BT12, distinguishes each burst type 62. Burst types 62 within table 60 are utilized to construct slot configuration table 30 (FIG. 1).

Message transmit size 64 and slot transmit rate 66 of each burst type 62 are predefined to accommodate the differing transmission capabilities (transmission rates) and needs (message sizes) of the various terminals 24 (FIG. 1) capable of random access to timeslots 52 (FIG. 2) within random access channel 40 (FIG. 2). Accordingly, it should be understood that message transmit size 64 and slot transmit rate 66 of each burst type 62 can vary greatly in accordance with the burst transmission characteristics of the particular terminals 24 (FIG. 1) communicating within random access channel 40 of a particular communications system 20.

FIG. 4 shows a diagram of a generalized timeslot configuration 72 for any one of timeslots 52. In general, timeslot 52 is a time interval, slot, or slice, in which one of terminals 24 can transmit its message 54. Timeslot configuration 72 provides an exemplary arrangement of any one of timeslots 52. Timeslot configuration 72 may include a guard time period 76 at the beginning and end of timeslot 52, a preamble 78 within a preamble time period 80, and a sync word 82 within a sync word period 84. Timeslot configuration 72 further includes a data payload period 86. Data payload period 86 may be empty, or unused, when none of terminals 24 are transmitting within timeslot 52. Alternatively, message 54 transmitted from one of terminals 24 may be contained within data payload period 86. Together, two occurrences of guard time period 76, preamble time period 80, sync word period 84, and data payload period 86 form slot duration 68 of timeslot 52.

Data payload period 86 corresponds to message transmit size 64 defined by burst type 62 (FIG. 3) of timeslot 52. Thus, data payload period 86 is variable, i.e., it can vary in duration in accordance with message transmit size 64 (FIG. 3) and slot transmit rate 66 (FIG. 3). When guard time period 76, preamble time period 80, sync word period 84 are constants for all timeslots 52, slot duration 68 will vary in accordance with message transmit size 64 (FIG. 3) and slot transmit rate 66 (FIG. 3). Timeslot configuration 72 is shown for purposes of explanation. Those skilled in the art will readily recognize that timeslot configuration 72 can take on various other forms.

FIG. 5 shows a diagram of slot configuration table 30 utilized in accordance with the present invention. Slot configuration table 30 is a lookup table, or data structure, stored at resource controller 22 (FIG. 1) and at terminals 24 (FIG. 1). Slot configuration table 30 provides a listing of timeslot patterns 88 that includes sets 50 of timeslots 52 that may be used within portion 48 (FIG. 2) of each of frames 42.

In general, each of timeslot patterns 88 is derived by identifying the combinations of timeslots 52 exhibiting certain burst types 62 (FIG. 3) that will fit into the time boundary of portion 48 of each of frames 42. For example, if a time boundary for portion 48 is 0.77 seconds, the summation of slot duration 68 (FIG. 3) for each of timeslots 52 within a particular one of timeslot patterns 88 cannot exceed the time boundary of 0.77 seconds.

Each of timeslot patterns 88 is identified by a unique slot pattern identifier 90. A slot configuration parameter associated with each slot pattern identifier 90 includes at least one slot number 92. The one or more slot numbers 92 provides a chronological listing of timeslots 52 that make up set 50 of timeslots within one of timeslot patterns 88. Burst type identifier 70, message transmit size 64, and slot transmit rate 66 are associated with each timeslot 52 listed by slot number 92. In addition, a slot start time parameter 94 and a slot end time parameter 96 are associated with each timeslot 52 listed by slot number 92. Slot start time parameter 94 and slot end time parameter 96 demarcate the location, i.e., where the occurrence of, one of timeslots 52 of one of timeslot patterns 88 will be within one of random access frames 42 (FIG. 2).

As shown, slot configuration table 30 includes a variety of timeslot patterns 88 defining various sets 50 of timeslots 52. For example, a first timeslot pattern 88 is identified by slot pattern identifier 90, labeled "A," and includes set 50 of a single timeslot 52 as indicated by slot number 92 of "1." Listed in conjunction with slot number 92 of "1," is burst type 62 having burst type identifier 90 of "BT1". Burst type 62 for that particular timeslot 52 defines message transmit size 64 as being "S1" and slot transmit rate 66 as being "R1." Slot start time 94 is indicated by "T1A" and slot end time 96 is indicated by "T2A."

Another timeslot pattern 88, identified by slot pattern identifier 90, labeled "D," includes set 50 of two timeslots 52 as indicated by slot numbers 92 of "1" and "2." Burst type 62, including burst type identifier 70, message transmit size 64, and slot transmit rate 66 is associated with each of slot numbers 92 for each of the two timeslots 52. In addition, slot start time 94 and slot end time 96 are associated with each of slot numbers 92 for each of the two timeslots 52. This above description can be extended to yet another timeslot pattern 88, identified by slot pattern identifier 90, labeled "G," which includes set 50 of three timeslots as indicated by slot numbers 92 of "1," "2," and "3" with their distinct burst types 62, and slot start and slot end times 94 and 96, respectively.

Slot configuration table 30 illustrated in FIG. 5 shows only a small number of timeslot patterns 88 that may be formed in response to the time boundary of portion 48 (FIG. 2) of frames 42 (FIG. 2) and based on the defined burst types 62 shown in FIG. 3. Ellipses indicate that slot configuration table 30 includes additional timeslot patterns 88 not shown herein for brevity. However, it should be understood that more or less than the number of timeslot patterns 88 shown may be formed depending upon the time boundary of portion 48 and based on particular defined burst types 62 for random access channel 40 (FIG. 2).

In addition, slot configuration table 30 shows a maximum number of timeslots 52 within set 50 as being three. The maximum number of timeslots 52 as shown is not a limitation of the present invention. Rather, timeslot patterns 88 containing sets 50 of timeslots 52 can include any number of timeslots 52 depending upon the time boundary of portion 48 of frames 42 and based on particular defined burst types 62 for a particular random access channel 40.

In general, resource controller 22 (FIG. 1) utilizes the information within slot configuration table 30 to determine a particular one of timeslot patterns 88 for each successive frame 42 (FIG. 2). The particular timeslot pattern 88 for future frame 58, i.e., frame N+1 (FIG. 2), is announced in current service announcement 55 within the previous frame, i.e., current frame 56 (i.e., frame N). Slot pattern identifier 90 may be communicated via current service announcement 55 of current frame 56 over links 26 (FIG. 1). Each of terminals 24 can subsequently access their respective stored slot configuration table 30 to obtain set 50 of timeslots 52 and burst types 62 associated with the particular slot pattern identifier 90.

Figure 6:
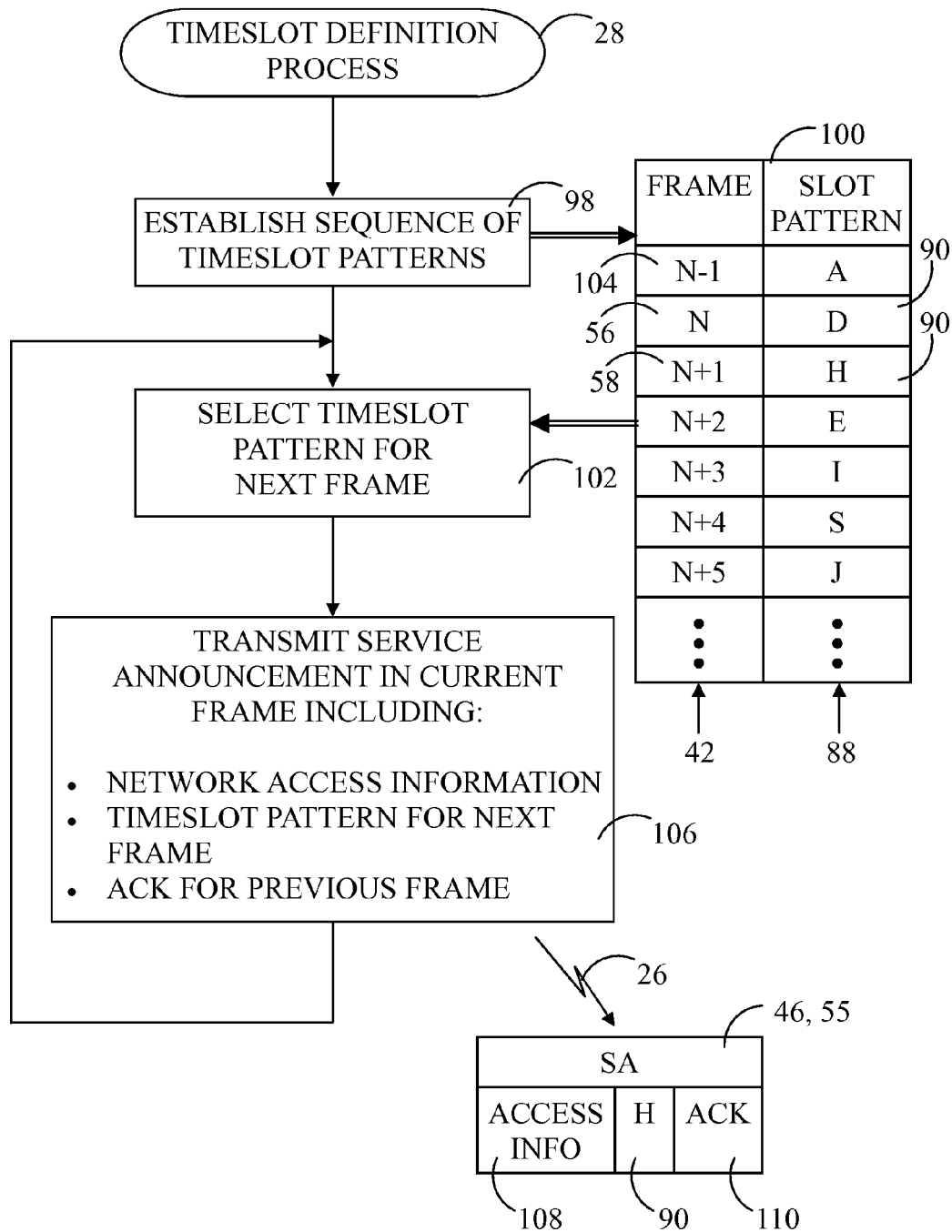
FIG. 6 shows a flowchart of a timeslot definition process.

FIG. 6 shows a flowchart of timeslot definition process 28. Timeslot definition process 28 is performed by resource controller 22 to select particular timeslot patterns 88 (FIG. 5) for successive frames 42 (FIG. 2) within random access channel 40 (FIG. 2). Timeslot definition process 28 begins with a task 98.

At task 98, a sequence of timeslot patterns 88 is established. Timeslot configuration table 30 (FIG. 5) provides a number of possible timeslot patterns 88. All or a subset of those timeslot patterns 88 may be used at task 98. In order to provide for robust random access timeslot selection in timeslot selection process 32 (FIG. 1), there must be a sufficient availability of timeslots 52 of each of burst types 62 (FIG. 3) within a finite time period. That is, establishing task 98 desirably diversifies burst types 62 for the available timeslots 52.

In one exemplary scenario, a sequence 100 of timeslot patterns 88 for successive frames 42 may be established by simply selecting each timeslot pattern 88 from slot configuration table 30 once. Alternatively, task 98 may perform a message traffic analysis and particular timeslot patterns 88 for sequence 100 may be adaptively selected to establish the optimal mixture of timeslot patterns 88 based upon the different types of terminals 24 and message traffic that resource controller 22 is servicing on random access channel 40. Regardless of how timeslot patterns 88 are established for sequence 100, this sequence 100 may be repeated in subsequent time periods.

Following task 98, a task 102 is performed. At task 102, resource controller 22 selects one of timeslot patterns 88 from sequence 100 for a next one of frames 42. To provide continuity with FIG. 2, current frame 56 is represented in sequence 100 as "N," future frame 58 is represented in sequence 100 as "N+1," and a previous frame 104 is represented in sequence 100 as "N−1." In this instance, resource controller 22 selects timeslot pattern 88 having slot pattern identifier 90 of "H" for future frame 58.

In response to task 102, a task 106 is performed. At task 106, resource controller 22 sends service announcement 46, in this particular case, current service announcement 55, in current frame 56 (FIG. 2) over links 26. Current service announcement 55 can include network access information 108, such as notification of random access and dedicated services. In addition, current service announcement 55 communicates the selected timeslot pattern 88 by sending, for example, slot pattern identifier 90. Current service announcement 55 can also include one or more acknowledgements, ACK 110, of successful transmission of one or more messages 54 (FIG. 2) within timeslots 52 of previous frame 104.

Following task 106, timeslot definition process 28 loops back to task 102, to select timeslot pattern 88 for the next one of frames 42 and to transmit service announcement 46 indicating timeslot pattern for the next one of frames 42 and ACK 110 for one or more messages 54 sent in the previous one of frames 42.

Figure 7:
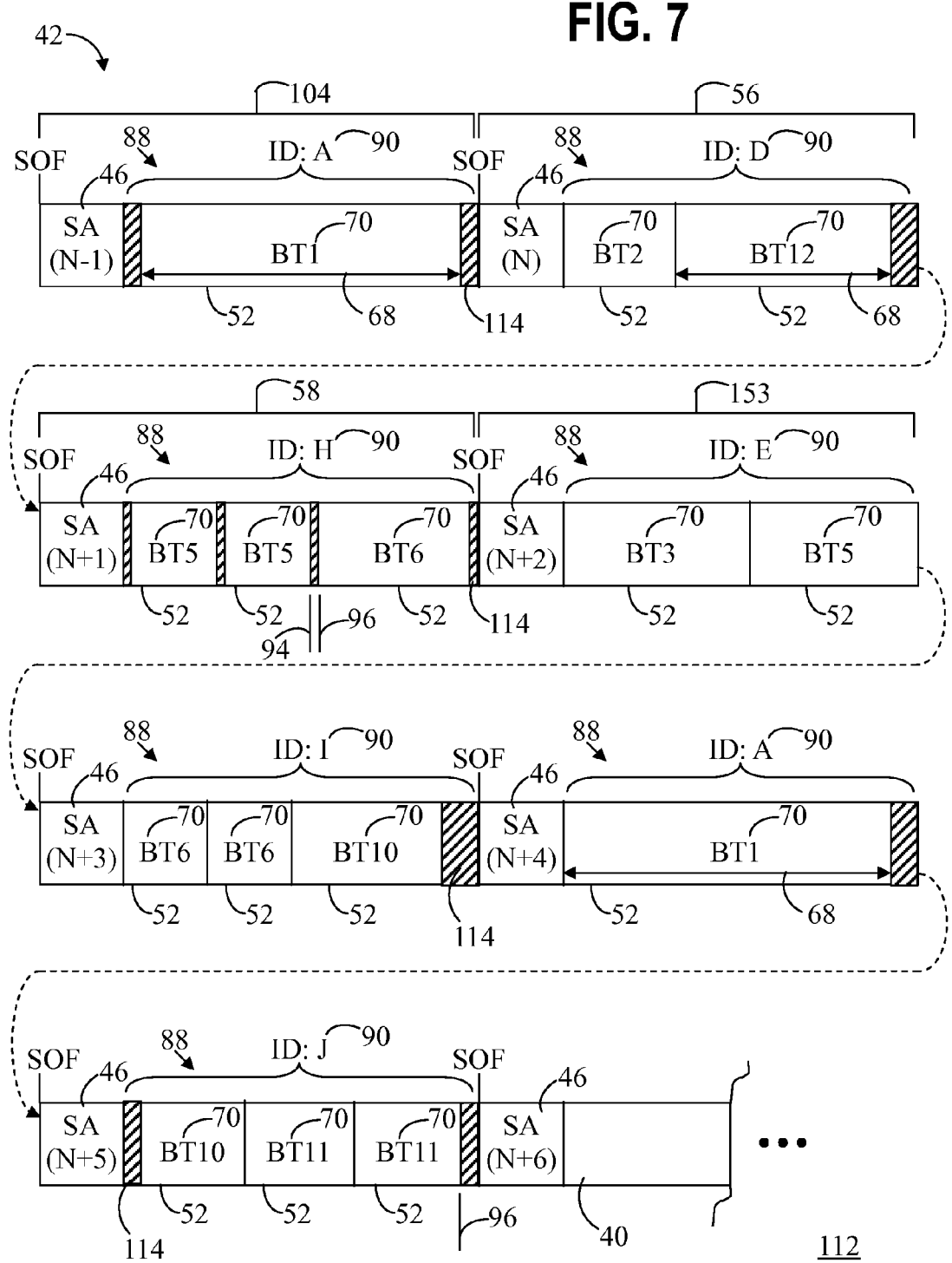
FIG. 7 shows a diagram of exemplary timeslot patterns assigned to successive frames of a random access communication channel.

FIG. 7 shows a diagram of timeslot patterns 88 assigned to successive frames 42 of random access communication channel 40 in accordance with sequence 100. As shown, random access communication channel 40 is divided into a successive sequence 112 of frames 42. Initiation of the transmission of service announcement 46 in each of frames 42 indicates the "start-of-frame" (SOF) to enable frame synchronization at every frame 42 so that terminals 24 can synchronize to random access channel 40.

Different timeslots 52 within each of timeslot patterns 88 for each of frames 42 exhibit message transmit sizes 64 (FIG. 3) and different slot transmit rates 66 (FIG. 3) as defined by their particular burst types 62 (FIG. 3). For purposes of illustration, the particular burst types 62 of the various timeslots 52 are distinguished in FIG. 7 by burst type identifiers 70.

It should be noted that timeslot duration 68 can vary between timeslots 52 in accordance with their particular burst types 62. Thus, some timeslot patterns 88 of timeslots 52 may completely fill portion 48 (FIG. 2) of particular frames 42. However, more realistically, some amount of portion 48 may remain unused. This unused time 114 may be distributed within frames 42, for example, immediately following a service announcement 46, immediately preceding the end of a frame 42, and/or between various slot start and slot end times 94 and 96, respectively.

FIG. 7 shows successive sequence 112 of frames 42 within random access channel 40 for illustrative purposes. However, it should be understood that terminals 24 (FIG. 1) do not have prior knowledge of the entire sequence 112 of frames 42. Rather, terminals 24 only receive timeslot pattern 88 for a single one of frames 42 in service announcement 46 contained in the immediately preceding one of frames 42. The knowledge of timeslot pattern 88 is utilized by terminals 24 for random access selection of one of timeslots for transmission of message 54 (FIG. 2).

Figure 8:
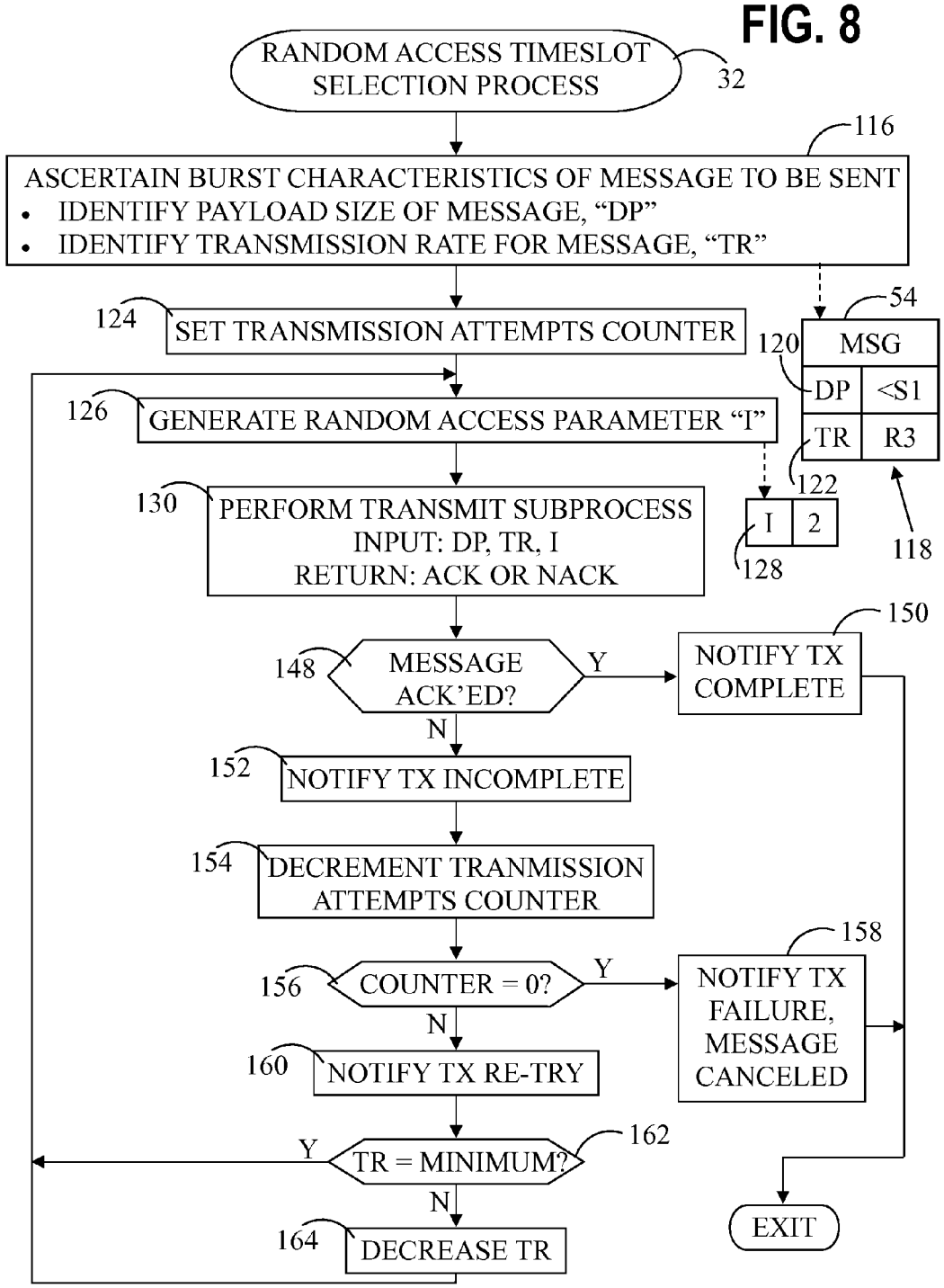
FIG. 8 shows a flowchart of a random access timeslot selection process.

FIG. 8 shows a flowchart of random access timeslot selection process 32. Process 32 entails a method of random access by terminal 24 to one of timeslots 52 within random access communication channel 40 (FIG. 2). Random access timeslot selection process 32 is initiated when terminal 24 has message 54 (FIG. 2) that it wishes to transmit utilizing the random access capability of communications system 20 (FIG. 1). Random access timeslot selection process 32 is described in connection with its execution at a single one of terminals 24. However, it should be understood that process 32 may be executed at any of terminals 24 within communications system 20 that needs random access to one of timeslots 52 (FIG. 7). Process 32 begins with a task 116.

At task 116, terminal 24 ascertains burst characteristics 118 of message 54 to be sent from terminal 24. Burst characteristics 118 include a payload size, DP, 120 of message 54 and a transmission rate, TR, 122 for message 54. Transmission rate 122 is desirably selected to be closest to the maximum transmission rate for terminal 24, based on a forward carrier to noise ratio measurement, without exceeding the maximum transmission rate for terminal 24.

Following task 116, a task 124 is performed. At task 124, a transmission attempts counter is set. The transmission attempts counter sets a maximum allowed number of transmission attempts that may be performed by terminal 24. The transmission attempts counter enables a number of retransmissions of message 54 from terminal 24 in the event of collisions. The transmission attempts counter may be set to, for example, four.

Next, a task 126 is performed. At task 126, a random access parameter, I, 128 is generated. In one embodiment, random access parameter 128 may be a randomly generated number between one and four. This random generation may be performed by using an identifying number of terminal 24 as a seed for a conventional random number generator. Random access parameter, I, 128 will be utilized to select the $I^{th}$ occurrence of one of timeslots 52 (FIG. 7) exhibiting one of burst types 62 (FIG. 3) corresponding to burst characteristics 118 of message 54.

Following task 126, a task 130 is performed. At task 130, a transmit subprocess is performed. Inputs to the transmit subprocess include payload size, DP, 120 of message 54, transmission rate, TR, 122 for message 54, and random access parameter, I, 128. A return, or output, from the transmit subprocess may be an acknowledgement (ACK) of successful transmission of message 54, or alternatively, no acknowledgement (NACK) of the transmission of message 54. NACK presumes a collision of message 54 transmitted from terminal 24 within one of timeslots 52 with another message 54 transmitted from another one of terminals 24 (FIG. 1) within the same one of timeslots 52.

Figure 9:
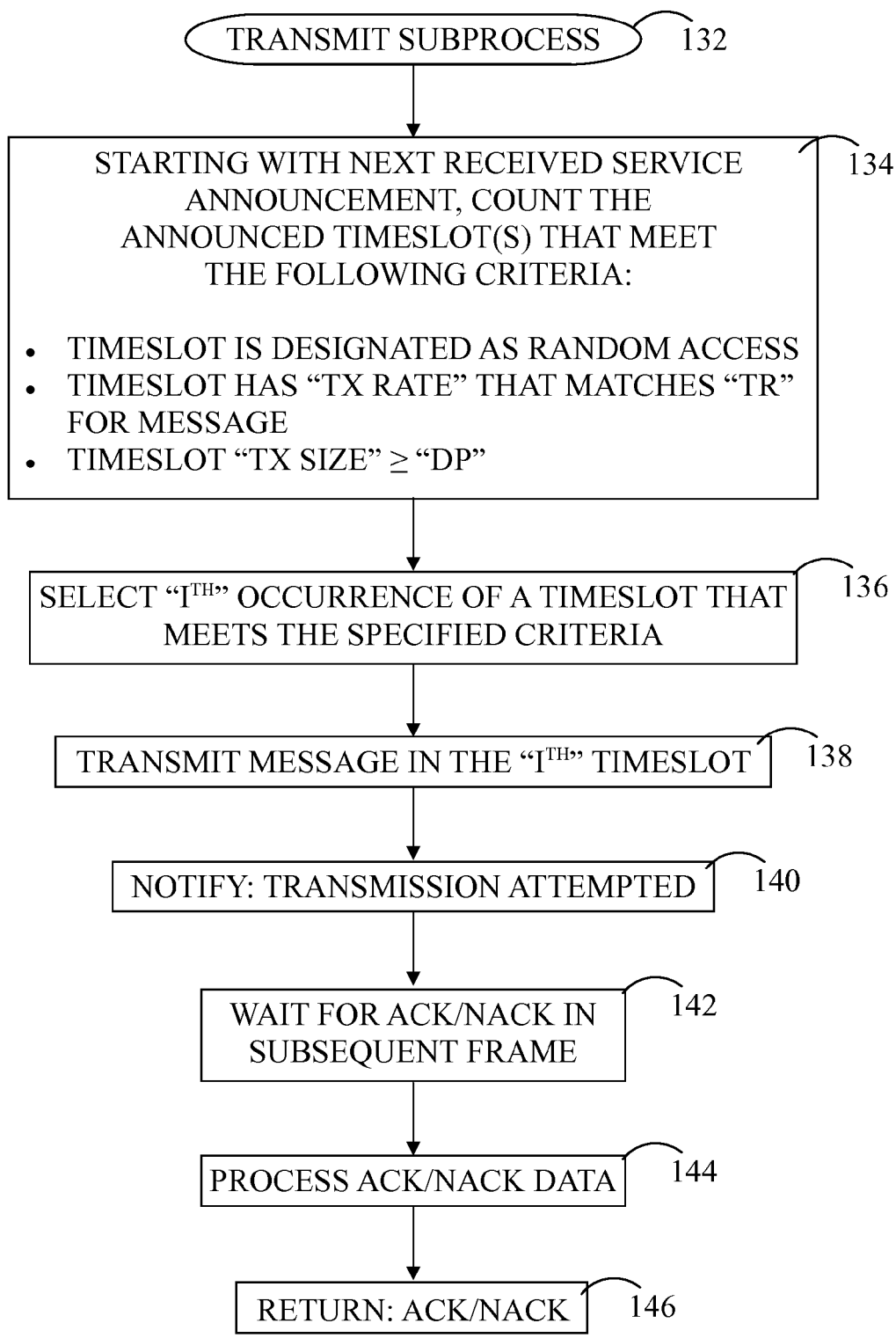
FIG. 9 shows a flowchart of a transmit subprocess of the random access timeslot selection process.

Referring to FIG. 9 in connection with task 130, FIG. 9 shows a flowchart of a transmit subprocess 132 of random access timeslot selection process 32. Transmit subprocess 132 begins with a task 134.

At task 134, starting with the next receive service announcement 46 (FIG. 7), terminal 24 counts the announced timeslots 52 that meet certain criteria. This criteria includes the timeslot 52 is designated as random access, the timeslot 52 has slot transmit rate 66 (FIG. 5) that matches transmission rate, TR, 122 (FIG. 8) for message 54, and timeslot 52 has message transmit size 64 (FIG. 5) that is at least equivalent to, i.e., greater than or equal to, payload size, DP, 120 of message 54.

A task 136 is performed in conjunction with task 134. At task 136, terminal 24 selects the $I^{th}$ occurrence, corresponding to the randomly generated random access parameter 128, of timeslot 52 that meets the criteria specified at task 134. The $I^{th}$ occurrence of one of timeslots 52 may occur in future frame 58 or in any subsequent frames 42 within sequence 112 (FIG. 7) of frames 42.

In response to task 136, a task 138 is performed. At task 138, message 54 is transmitted from terminal 24 in the $I^{th}$ occurrence of timeslot 52 (FIG. 7).

A task 140 subsequently notifies the user of terminal 24 that transmission has been attempted. For example, terminal 24 may include a user interface, such as a display, that notifies the user that transmission has been attempted.

Transmit subprocess 132 continues with a task 142. At task 142, terminal 24 waits for acknowledgement, ACK 110 (FIG. 6) or no acknowledgement, NACK, in the subsequent frame 42 or frames 42.

A task 144 is performed upon detection of a subsequent frame 42. At task 144, terminal 24 processes the ACK/NACK data. By way of example, terminal 24 examines service announcement 46 (FIG. 7) of the subsequent frame 42 to determine the presence of ACK 110 associated with message 54 that was transmitted from terminal 24. When ACK 110 is not present in service announcement 46 within subsequent frame 42, an unsuccessful transmission of message 54 is detected.

Next, a task 146 returns ACK 110 or NACK information to random access timeslot selection process 32, and transmit subprocess 132 is discontinued. Referring back to FIG. 8, when transmit subprocess 132 is discontinued, random access timeslot selection process 32 continues with a query task 148.

At query task 148, a determination is made as to whether ACK 110 (FIG. 6) was returned from transmit subprocess 132. In other words, query task 148 determines whether resource controller 22 (FIG. 1) acknowledged receipt of message 54. When ACK 110 is returned from transmit subprocess 132, program control continues with a task 150.

At task 150, notification is made to the user of terminal 24 through the user interface of terminal 24 that transmission is complete. Following successful transmission of message 54, and subsequent notification thereof at task 150, random access timeslot selection process 32 exits.

However, at query task 148, when ACK 110 is not returned from transmit subprocess 132, indicating the detection of an unsuccessful transmission of message 54, program control continues with a task 152. At task 152, notification is made to the user of terminal 24 through the user interface of terminal 24 that transmission is incomplete.

Exemplary burst characteristics 118 for message 54 include payload size, DP, 120 as being less than S1 and transmission rate, TR, 122 as being R3. Thus, one of burst types 62 best suited for transmission of message 54 having these burst characteristics 118 is identified by burst type identifier 70 (FIG. 3) labeled BT5. As further shown, random access parameter, I, 128 is 2.

Now referring back to FIGS. 6 and 7, current service announcement 55 within current frame 56 announces slot pattern identifier 90 (FIG. 5) of "H." Thus, timeslot pattern 88 for future frame 58 includes three timeslots 52, two of which are timeslots 52 exhibiting burst type 62 (FIG. 3) of "BT5." Since random access parameter, I, 128 equals 2, terminal 24 will select the second occurrence of timeslot 52 exhibiting burst type 62 of "BT5."

In another example, if random access parameter, I, 128 is 3, then terminal 24 will select the third occurrence of timeslot 52 exhibiting burst type 62 of "BT5" which occurs in a later one of frames 42 in sequence 112. By way of example, service announcement 46 within future frame 58 identifies a second set of timeslots 52 in a subsequent one of frames 42, referred to herein as a second future frame 153. Selection, at task 136 (FIG. 9) of transmit subprocess 132 (FIG. 9) utilizes service announcement 46 within future frame 58 to select timeslot 52, exhibiting burst type 62 of "BT5" within second future frame 153. Thus, random access parameter 128 functions as a variable delay so that messages 54 being transmitted from two or more terminals 24 are less likely to collide within timeslots 52.

With reference back to random access timeslot selection process 32 (FIG. 8), following notification of incomplete transmission at task 152, a task 154 is performed. At task 154, terminal 24 decrements its transmission attempts counter.

A query task 156 is performed in conjunction with task 154. At query task 156, a determination is made as to whether the transmission attempts counter is now equal to zero. When the value on the counter is equal to zero, process control continues with a task 158. At task 158, notification is made to the user of terminal 24 through the user interface of terminal 24 that the transmission attempt(s) of message 54 failed. Message 54 is subsequently canceled and random access timeslot selection subprocess 32 exits.

On the other hand, when a determination is made at query task 156 that the transmission attempts counter is not yet equal to zero, process control continues with a task 160.

At task 160, notification is made to the user of terminal 24 through the user interface of terminal 24 that transmission of message 54 will be re-tried, or repeated. Timeslot selection process 32 can then proceed to a query task 162.

At query task 162, terminal 24 determines whether transmission rate, TR, 122 is at a pre-determined minimum transmission rate. When transmission rate 122 is not equal to the minimum transmission rate, process 32 continue with a task 164.

At task 164, transmission rate 122 is decreased to increase the probability of a successful transmission. Program control then loops back to task 126 to generate another random access parameter 128 and to attempt re-transmission of message 54 at the lower transmission rate 122. However, when task 162 determines that transmission rate 122 is already set to the minimum transmission rate, program control again loops back to task 126 to generate another random access parameter 128 and to attempt transmission of message 54 without first re-setting transmission rate 122.

It should be understood that transmission rate 122 originally identified at task 116 may be the predetermined minimum transmission rate. Accordingly, execution of query task 162 will result in no change to transmission rate 122 prior to another attempt at transmission of message 54.

The loop back scheme of random access timeslot selection process 32 is continued until either message 54 is successfully transmitted or until multiple attempts at transmitting message 54 are unsuccessful, as monitored by the transmission attempts counter.

In summary, the present invention teaches of methodology and a system for random access by a terminal to a timeslot within a random access communication channel. The methodology and system enable a terminal to select a random access timeslot for transmission exhibiting a burst type that best fits the burst characteristics (transmission rate and message payload size) of the message to be transmitted from the terminal. Moreover, a resource controller is provided that establishes timeslot patterns in successive frames of the communication channel. The timeslot patterns used to produce random access timeslots in successive frames can have different slot transmission rates and message transmit sizes to best suit the capabilities and the needs of the terminals within the communication system.

Although the preferred embodiments of the invention have been illustrated and described in detail, it will be readily apparent to those skilled in the art that various modifications may be made therein without departing from the spirit of the invention or from the scope of the appended claims. For example, the process steps discussed herein can take on great number of variations and can be performed in a differing order than that which was presented.

What is claimed is:

1. A method of random access by a terminal to a timeslot within a communication resource comprising:
    ascertaining a burst characteristic of a message to be sent from said terminal;
    generating a random access parameter, said random access parameter being a number, I, said ascertaining and generating operations being performed by said terminal within a communication system;
    selecting said timeslot from a set of timeslots within said communication resource, said terminal selecting an $I^{th}$ occurrence of said timeslot in said set of timeslots each of which have a burst type corresponding to said burst characteristic of said message, wherein differing timeslots within said set of timeslots are characterized by differing ones of said burst type, and said selecting operation includes selecting said $I^{th}$ occurrence of said timeslot in said set of timeslots having said burst type that most closely corresponds with said burst characteristic of said message; and
    transmitting said message from said terminal in said selected timeslot.

2. A method as claimed in claim 1 wherein said burst characteristic includes a payload size, said burst type defines a message transmit size, and:
    said ascertaining operation comprises identifying said payload size of said message; and
    said selecting operation selects said $I^{th}$ occurrence of said timeslot in said set of timeslots with said burst type defining said message transmit size as being at least equivalent to said payload size.

3. A method as claimed in claim 1 wherein said burst characteristic includes a transmission rate, said burst type defines a slot transmit rate, and:
    said ascertaining operation comprises identifying said transmission rate for said message; and
    said selecting operation selects said $I^{th}$ occurrence of said timeslot in said set of timeslots with said burst type defining said slot transmit rate as matching said transmission rate.

4. A method as claimed in claim 1 wherein said communication resource is divided into a sequence of frames, and said method further comprises:
    receiving, at said terminal, a service announcement in a current frame of said sequence of frames from a resource controller, said service announcement identifying said set of timeslots within a future frame of said sequence of frames; and
    said selecting operation utilizes said service announcement to select said $I^{th}$ occurrence of said timeslot from said set of timeslots.

5. A method as claimed in claim 4 further comprising:
    receiving, at said terminal, a second service announcement in said first future frame from said resource controller, said second service announcement identifying a second set of timeslots within a second future frame of said sequence of frames, said second future frame following said first future frame; and
    said selecting operation utilizes said second service announcement to select said $I^{th}$ occurrence of said timeslot from said second set of timeslots in accordance with said random access parameter.

6. A method of random access by a terminal to a timeslot within a communication resource, said communication resource being divided into a sequence of frames, and said method comprising:
ascertaining a burst characteristic of a message to be sent from said terminal;
generating a random access parameter, said ascertaining and generating operations being performed by said terminal within a communication system;
establishing, prior to said ascertaining operation, a plurality of timeslot patterns, each of said timeslot patterns defining a unique set of timeslots that may be utilized within a future frame of said sequence of frames;
selecting, at a resource controller, one of said timeslot patterns to obtain said unique set of timeslots for assignment as a set of timeslots within said future frame;
receiving, at said terminal, a service announcement in a current frame of said sequence of frames from said resource controller, said service announcement identifying said set of timeslots within said future frame of said sequence of frames;
selecting said timeslot from said set of timeslots within said communication resource in accordance with said random access parameter, said selecting operation utilizing said service announcement to select said timeslot from said set of timeslots, and said timeslot exhibiting a burst type corresponding to said burst characteristic of said message; and
transmitting said message from said terminal in said selected timeslot.

7. A method as claimed in claim 6 wherein said terminal is one of a plurality of terminals operable within said communication system, and said method further comprises:
performing, at said resource controller, a message traffic analysis to identify different types of said plurality of terminals and message traffic within said communication system; and
adaptively selecting, at said resource controller, said one of said timeslot patterns to obtain said unique set of timeslots in response to said message traffic analysis.

8. A method as claimed in claim 1 further comprising:
detecting, at said terminal, an unsuccessful transmission of said message;
generating a second random access parameter;
selecting a second timeslot from a second set of timeslots in accordance with said second random access parameter, said second timeslot exhibiting said burst type; and
transmitting said message from said terminal in said selected second timeslot.

9. A method as claimed in claim 8 wherein said burst characteristic includes a first transmission rate, and said method further comprises:
choosing a second transmission rate that is less than said first transmission rate in response to said detected unsuccessful transmission of said message; and
said selecting said second timeslot operation selects said second timeslot that exhibits a second burst type corresponding to said second transmission rate.

10. A method as claimed in claim 1 wherein said communication resource is a random access transmission resource maintained within a Demand Assigned Multiple Access (DAMA) communication system.

11. A method of random access by a terminal to a timeslot within a communication resource, said communication resource being divided into a sequence of frames, and said method comprising:
ascertaining a burst characteristic of a message to be sent from said terminal, said burst characteristic including a payload size and transmission rate;
generating a random access parameter, said ascertaining and generating operations being performed by said terminal within a communication system;
receiving, at said terminal, a first service announcement in a current frame of said sequence of frames from a resource controller, said first service announcement identifying a first set of timeslots within a first future frame of said sequence of frames;
receiving, at said terminal a second service announcement in said first future frame from said resource controller, said second service announcement identifying a second set of timeslots within a second future frame of said sequence of frames, said second future frame sequentially following said first future frame;
selecting said timeslot from one of said first and second sets of timeslots within said communication resource in accordance with said random access parameter, said terminal utilizing at least one of said first and second service announcements to select said timeslot, said timeslot exhibiting a burst type corresponding to said burst characteristic of said message, said burst type defining a message transmit size and a slot transmit rate, said selecting operation selects said timeslot with said burst type defining said message transmit size as being at least equivalent to said payload size, and said burst type defining said slot transmit rate that matches said transmission rate; and
transmitting said message from said terminal in said selected timeslot.

12. A method as claimed in claim 11 wherein differing ones of said timeslots within said first and second sets of timeslots are characterized by differing ones of said burst types, and said selecting operation includes selecting said timeslot from said one of said first and second sets of timeslots having said burst type that most closely corresponds with said burst characteristic of said message.

13. A method as claimed in claim 11 further comprising:
defining said random access parameter to be an $I^{th}$ occurrence of said timeslot exhibiting said burst type corresponding to said burst characteristic of said message; and
said terminal selects said $I^{th}$ occurrence of said timeslot within said sequence of frames that exhibits said burst type for transmission of said message.

14. A method as claimed in claim 11 further comprising:
detecting, at said terminal, an unsuccessful transmission of said message;
generating a second random access parameter;
selecting a second timeslot from a second set of timeslots in accordance with said second random access parameter, said second timeslot exhibiting said burst type; and
transmitting said message from said terminal in said selected second timeslot.

* * * * *